United States Patent
Duquette et al.

(10) Patent No.: US 11,537,313 B1
(45) Date of Patent: Dec. 27, 2022

(54) DUAL CAST MIRRORING FROM HOST DEVICES

(71) Applicant: EMC IP HOLDING COMPANY LLC, Hopkinton, MA (US)

(72) Inventors: Jason J Duquette, Milford, MA (US); James M Guyer, Northboro, MA (US); Thomas Mackintosh, Waltham, MA (US); Earl Medeiros, Fall River, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/399,129

(22) Filed: Aug. 11, 2021

(51) Int. Cl.
*G06F 3/06* (2006.01)

(52) U.S. Cl.
CPC .............. *G06F 3/065* (2013.01); *G06F 3/067* (2013.01); *G06F 3/0613* (2013.01); *G06F 3/0656* (2013.01); *G06F 3/0659* (2013.01)

(58) Field of Classification Search
CPC ......... G06F 3/065; G06F 3/0656; G06F 3/067

USPC .......................................................... 711/162
See application file for complete search history.

(56) References Cited

U.S. PATENT DOCUMENTS

| 2011/0235640 A1* | 9/2011 | Singh ...................... H04L 45/22 370/392 |
| 2014/0115223 A1* | 4/2014 | Guddeti .................. G06F 13/14 710/314 |
| 2019/0347125 A1* | 11/2019 | Sankaran ............... G06F 9/4881 |

\* cited by examiner

*Primary Examiner* — Than Nguyen
(74) *Attorney, Agent, or Firm* — Anderson Gorecki LLP

(57) ABSTRACT

Mirrored volatile memory in a storage system is configured with a dual cast region of addresses. Buffers in the dual cast region are allocated for data associated with a received Write IO. A host IO device associates the dual cast addresses with the data. A switch or CPU complex recognizes the dual cast addresses associated with the data and, in response, creates and sends a first copy of the data to a first volatile memory mirror and creates and sends a second copy of the data to a second volatile memory mirror. The second copy may be sent via PCIe NTB between switches or CPU complexes.

20 Claims, 8 Drawing Sheets

DUAL CAST MIRRORING FROM HOST DEVICES

TECHNICAL FIELD

The subject matter of this disclosure is generally related to electronic data storage systems, and more particularly to data storage systems that implement mirroring.

BACKGROUND

High-capacity data storage systems such as storage area networks (SANs), network-attached storage (NAS), and storage arrays are used to maintain large storage objects and contemporaneously support multiple clients such as host servers. A storage array includes a network of specialized interconnected compute nodes that manage access to data stored on arrays of drives. The compute nodes respond to input-output (IO) commands from host applications running on the host servers. Examples of host applications may include, but are not limited to, software for email, accounting, manufacturing, inventory control, and a wide variety of other business processes. Storage systems implement mirroring to reduce failover response latency and avoid data loss. Generally, mirroring entails maintaining two copies of a data set, sometimes on identical hardware. For example, disk mirroring can include maintaining copies of a data set on identical disk drives. Corresponding extents of the mirrored data set may be maintained at the same locations, e.g., at the same addresses or logical addresses on the identical disk drives. Other hardware, including but not limited to volatile memory and compute nodes, may be used in mirroring.

SUMMARY

All examples, aspects, and features mentioned in this document can be combined in any technically possible way.

In accordance with some implementations a storage system comprises: a first compute node comprising at least one processor; a first volatile memory in communication with the first compute node; a second compute node comprising at least one processor; a second volatile memory in communication with the first compute node and configured to mirror the first volatile memory; a host IO device in communication with a host and the first compute node; and dual casting logic configured to create and send a first copy of data associated with a write command to the first volatile memory and a second copy of the data to the second volatile memory.

In accordance with some implementations a mirroring method is implemented in a storage system that includes a first compute node, a first volatile memory in communication with the first compute node, a second compute node, a second volatile memory in communication with the first compute node and configured to mirror the first volatile memory, and a host IO device in communication with a host and the first compute node, the method comprising: allocating buffers in a region of dual cast addresses of the first volatile memory and the second volatile memory; associating the dual cast addresses with received Write IO data; and responsive to recognition that the data is associated with dual cast addresses, creating and sending a first copy of the data to the first volatile memory and creating and sending a second copy of the data to the second volatile memory without reading the data from either the first volatile memory or the second volatile memory.

In accordance with some implementations a non-transitory computer-readable storage medium stores instructions that when executed by a storage system cause the storage system to perform a method for mirroring, the method comprising: allocating buffers in a region of dual cast addresses of a first volatile memory and a second volatile memory; associating the dual cast addresses with received Write IO data; and responsive to recognition that the data is associated with dual cast addresses, creating and sending a first copy of the data to the first volatile memory and creating and sending a second copy of the data to the second volatile memory without reading the data from either the first volatile memory or the second volatile memory.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile electronic storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
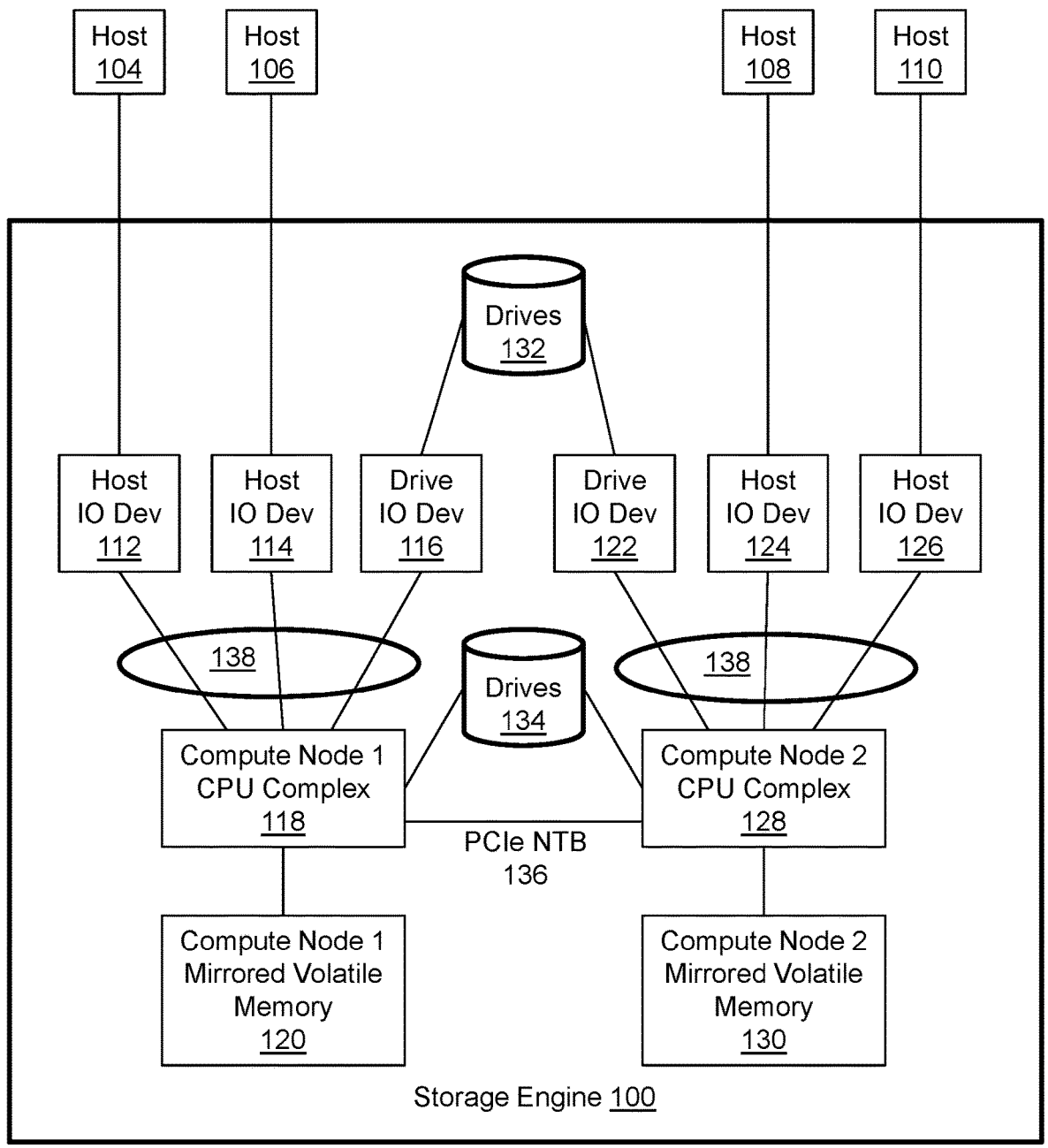
FIG. 1 illustrates a storage engine with CPU complexes that are configured to mirror data associated with a write command from a host by dual casting the data before the data is written to mirrored volatile memory.

FIG. 1 illustrates a storage engine with CPU complexes that are configured to mirror data associated with a write command from a host by dual casting the data before the data is written to mirrored volatile memory. The storage engine 100 is depicted in a simplified environment with four host servers 104, 106, 108, 110 that run host applications. The host servers may be implemented as individual physical computing devices, virtual machines running on the same hardware platform under control of a hypervisor, or in containers on the same hardware platform. The storage engine 100 includes mirrored storage director compute nodes arranged in a failover relationship. A first storage director compute node includes two host IO devices 112, 114, a drive IO device 116, a CPU complex 118, and volatile memory 120, each of which is a tangible hardware subsystem. A second storage director compute node includes two host IO devices 124, 126, a drive IO device 122, a CPU complex 128, and volatile memory 130, each of which is a tangible hardware subsystem. Volatile memory 130 is a mirror of volatile memory 120. The mirrored volatile memory is protected by a backup power source and vaulting that enables dirty data to be copied from volatile memory to persistent storage in the event of an emergency shutdown. The drive IO devices 116, 122 are configured to communicate with a first set of dual-ported non-volatile storage drives 132. The CPU complexes 118, 128 are configured to communicate with a second set of dual-ported non-volatile storage drives 134. Unlike the first set of dual-ported drives, the second set of dual-ported non-volatile storage drives 134 are directly connectable to the CPU complexes based on common support of a suitable protocol, specification, or standard such as non-volatile memory express (NVMe). For example, non-volatile drives 134 may be NVMe drives and non-volatile drives 132 may be serial attached SCSI (SAS) drives that require the drive 10 devices to interface with the CPU complexes. The host 10 devices and drive 10 devices may be configured to interface with the CPU complexes via peripheral component interconnect express (PCIe) ports 138. The CPU complexes 118, 128 are interconnected via a PCIe non-transparent bridge 136.

Individual host 10 devices are configured to communicate with individual hosts to service IOs such as read commands and write commands. For example, host 10 device 112 is configured to communicate with host 104. An 10 command from host 104 to write data is received by host 10 device 112 and processed to cause the corresponding data to be written to mirrored volatile memory 120 via CPU complex 118. The storage director nodes are mirrored, so a copy of the write data must also be written to mirrored volatile memory 130. The data is eventually destaged from the mirrored volatile memory to the non-volatile drives.

An advantage of mirroring is that the first storage director compute node can quickly failover to the second storage director compute node without losing dirty data in volatile memory or losing the ability to quickly access hot data that is present in volatile memory. However, reading a copy of data from mirrored volatile memory 120 and sending the copy to mirrored volatile memory 130, as has previously been common practice, requires time and processing/memory resources. The illustrated example includes an improvement in that the CPU complex 118 is configured to write the mirrored data by dual casting the data to both volatile memory mirrors 120, 130 before the data is written to either of the volatile memory mirrors. Consequently, a memory read operation is avoided.

Figure 2:
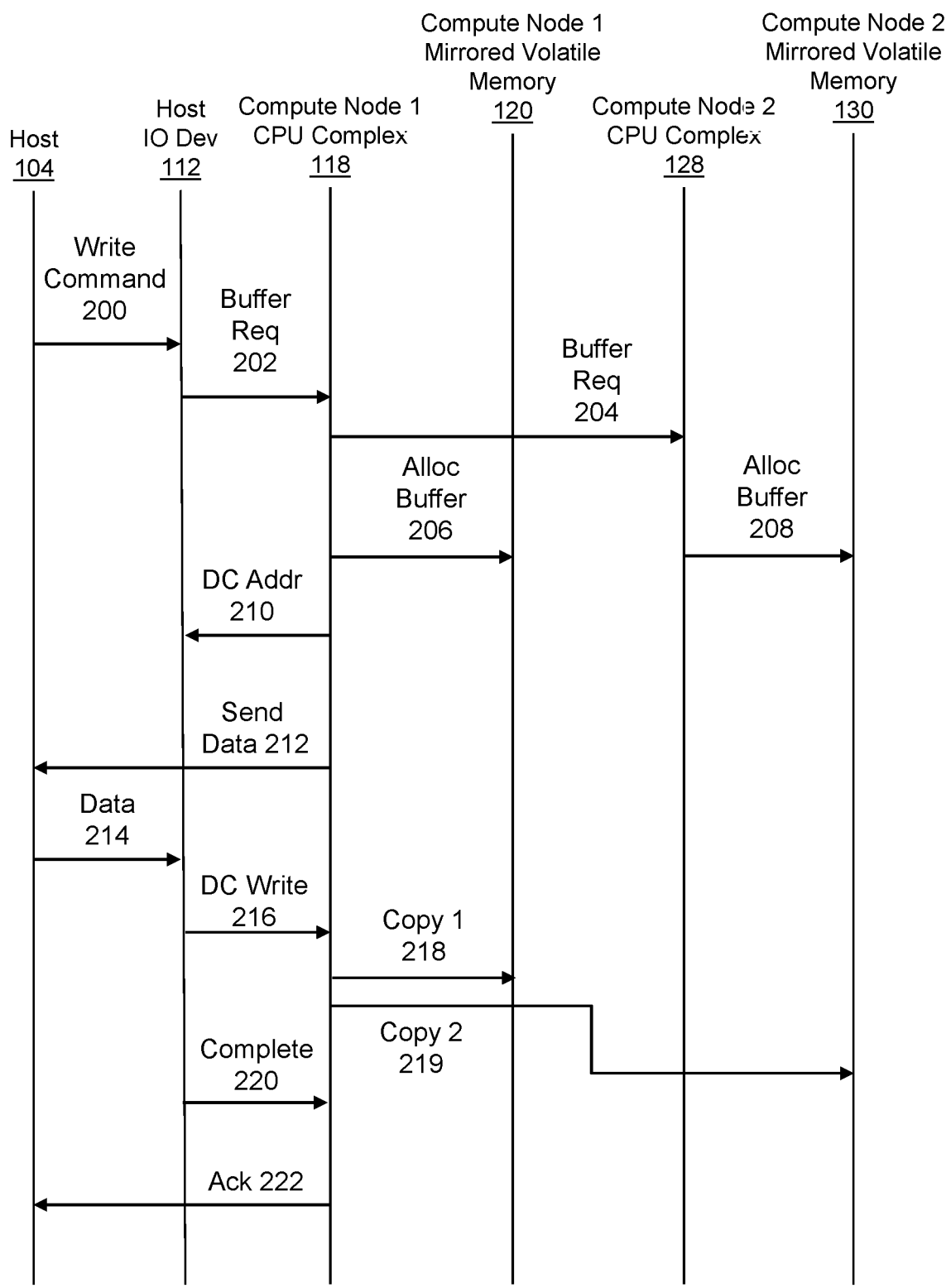
FIG. 2 illustrates signaling associated with dual casting the data in the storage engine of FIG. 1.

FIG. 2 illustrates signaling associated with dual casting the data. A write command 200 is sent from host 104 to host IO device 112. Responsive signaling from the host IO device to storage control logic running on CPU complex 118 includes buffer requests 202, 204 to obtain free space in the mirrored volatile memory 120, 130 for data associated with the write command. Responsive to the buffer requests, the CPU complexes 118, 128 allocate buffers in their respective mirrored volatile memories 120, 130, which may include related buffer allocation signaling 206, 208. The allocated buffers in each volatile memory mirror have the same range of addresses from a dual casting region of the overall address space. The allocated dual casting region addresses 210 are provided to the host IO device 112. Having completed preparation to receive the data, the CPU complex 118 provides a send data message 212 to host 104 via the host IO device. The host 104 subsequently sends the data 214 to the host IO device 112. Host IO device 112 associates the allocated dual cast addresses with the data, which together form a dual cast region write 216 that is sent to CPU complex 118. CPU complex 118 receives the dual cast write 216 and, responsive to recognition of the addresses as being in the dual casting region of volatile memory, dual casts the data by creating and sending a first copy 218 of the data to volatile memory 120 and a second copy 219 of the data to volatile memory 130 via the PCIe NTB 136 (FIG. 1) between the CPU complexes. Either or both the first and second copies may be written to mirrored volatile memory using direct memory access (DMA) operations. The host IO device 112 sends a write complete 220 message to the storage control logic running on CPU complex 118, responsive to which the storage control logic sends an acknowledgement 222 to the host 104 via the host IO device 112.

Figure 3:
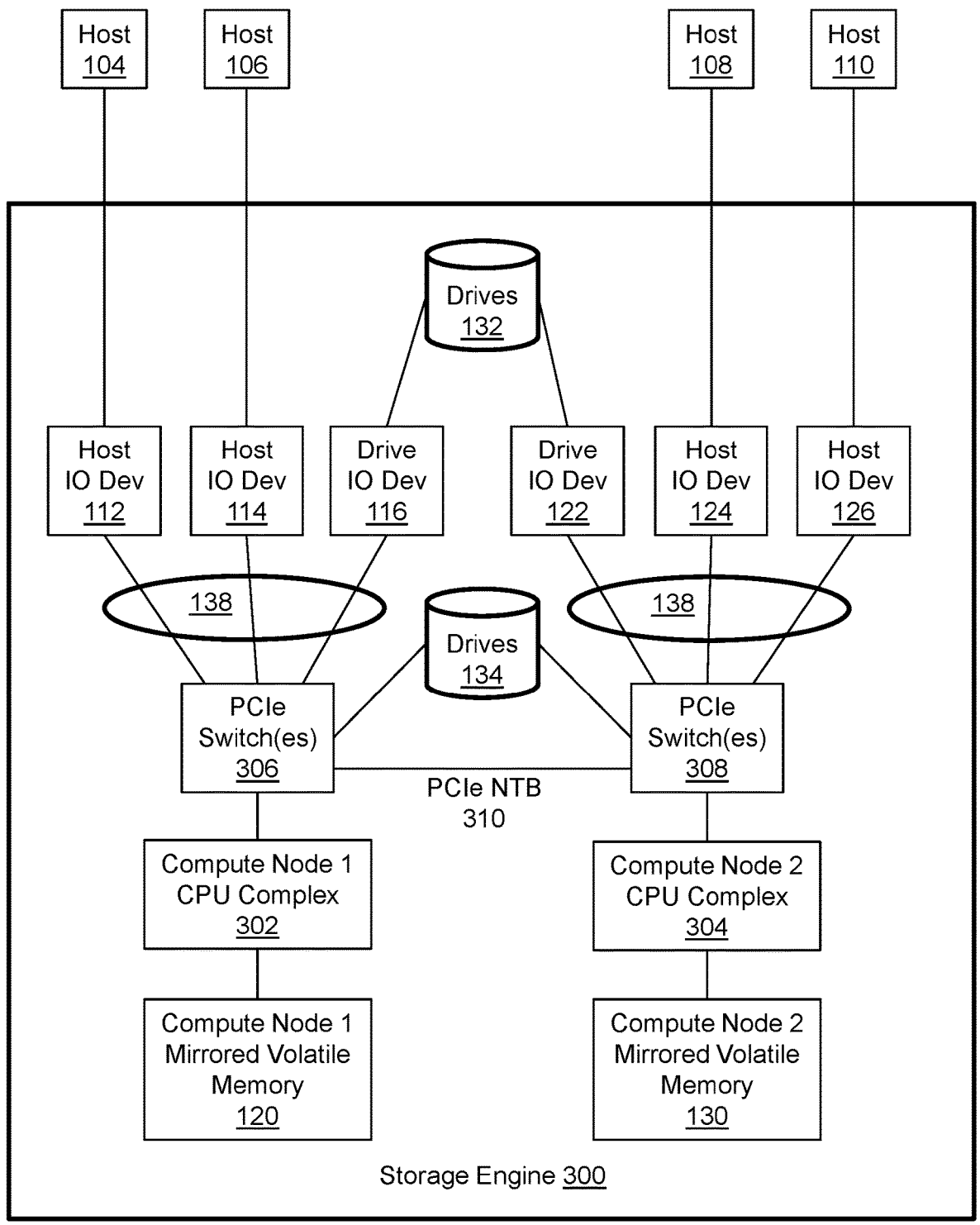
FIG. 3 illustrates a storage engine with switches that are configured to mirror data associated with a write command from a host by dual casting the data before the data is written to mirrored volatile memory.

FIG. 3 illustrates a storage engine with switches that are configured to mirror data associated with a write command from a host by dual casting the data before the data is written to mirrored volatile memory. The storage engine 300 includes mirrored storage director compute nodes arranged in a failover relationship. A first storage director compute node includes two host IO devices 112, 114, a drive IO device 116, PCIe switch(es) 306, a CPU complex 302, and mirrored volatile memory 120, each of which is a tangible hardware subsystem. A second storage director compute node includes two host IO devices 124, 126, a drive IO device 122, PCIe switch(es) 308, a CPU complex 304, and mirrored volatile memory 130, each of which is a tangible hardware subsystem. The CPU complexes 118, 128 are not configured to directly communicate with each other or the dual-ported non-volatile storage drives. The second set of dual-ported non-volatile storage drives 134 are directly connectable to the PCIe switches based on common support of a suitable protocol, specification, or standard such as NVMe. The PCIe switch(es) 306, 308 are interconnected via PCIe non-transparent bridge 310. In addition to providing the PCIe NTB link between the storage director compute nodes, the PCIe switches facilitate fan-in of host IO devices, drive IO devices and drives to the CPU complexes. The PCIe switches are configured to write mirrored data by recognizing and dual casting the data to both volatile memory mirrors 120, 130 before the data is written to either of the volatile memory mirrors.

Figure 4:
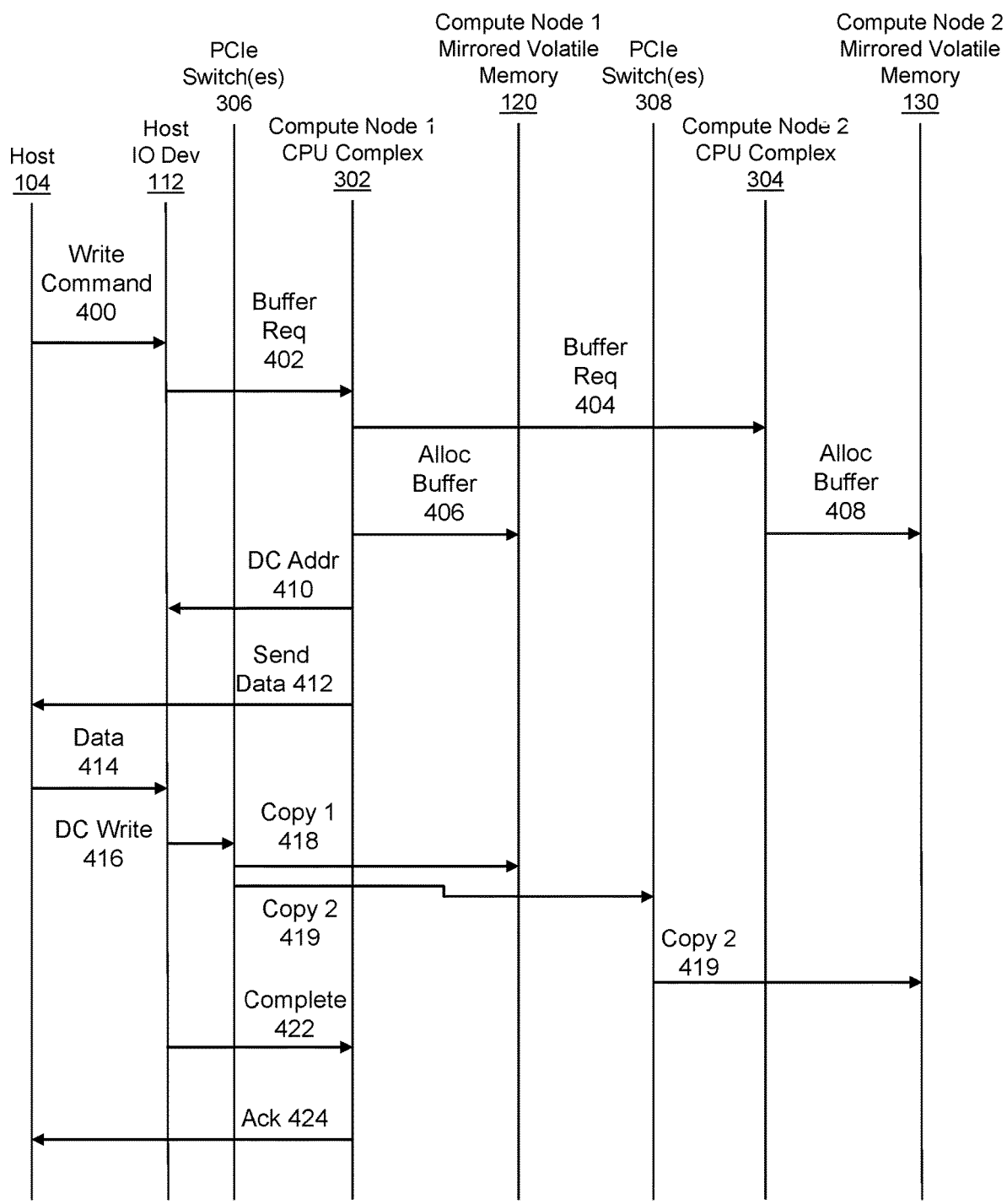
FIG. 4 illustrates signaling associated with dual casting the data in the storage engine of FIG. 3.

FIG. 4 illustrates signaling associated with dual casting data by the switches of the storage engine of FIG. 3. A write command 400 is sent from host 104 to host IO device 112. Responsive signaling from the host IO device to storage control logic running on CPU complex 302 includes buffer requests 402, 404 to obtain free space in the mirrored volatile memory 120, 130 for data associated with the write command. Responsive to the buffer requests, the CPU complexes 302, 304 allocate buffers in their respective mirrored volatile memory 120, 130, which may include related buffer allocation signaling 406, 408. The allocated buffers in each volatile memory mirror have the same range of addresses in a dual casting region. The allocated dual casting region addresses 410 are provided to the host IO device 112. Having completed preparation to receive the data, the CPU complex 302 provides a send data message 412 to host 104 via the host IO device. Host 104 subsequently sends the data 414 to the host IO device 112. The host IO device associates the allocated dual casting addresses with the data, which together form a dual cast region write 416 that is sent to PCIe switch(es) 306. The PCIe switch(es) 306 receive the dual cast region write 416 and, responsive to recognition of the addresses as being in the dual casting region of volatile memory, dual cast the data 414 by creating and sending a first copy 418 of the data to volatile memory 120 and a second copy 419 of the data to volatile memory 130 via the PCIe NTB 310 (FIG. 3) between the PCIe switches 306, 308. Either or both the first and second copies may be written to the mirrored volatile memory using DMA operations. The host IO device 112 sends a write complete 422 message to the storage control logic running on CPU complex 302, responsive to which the storage control logic sends an acknowledgement 424 to the host 104 via the host IO device 112.

Figure 5:
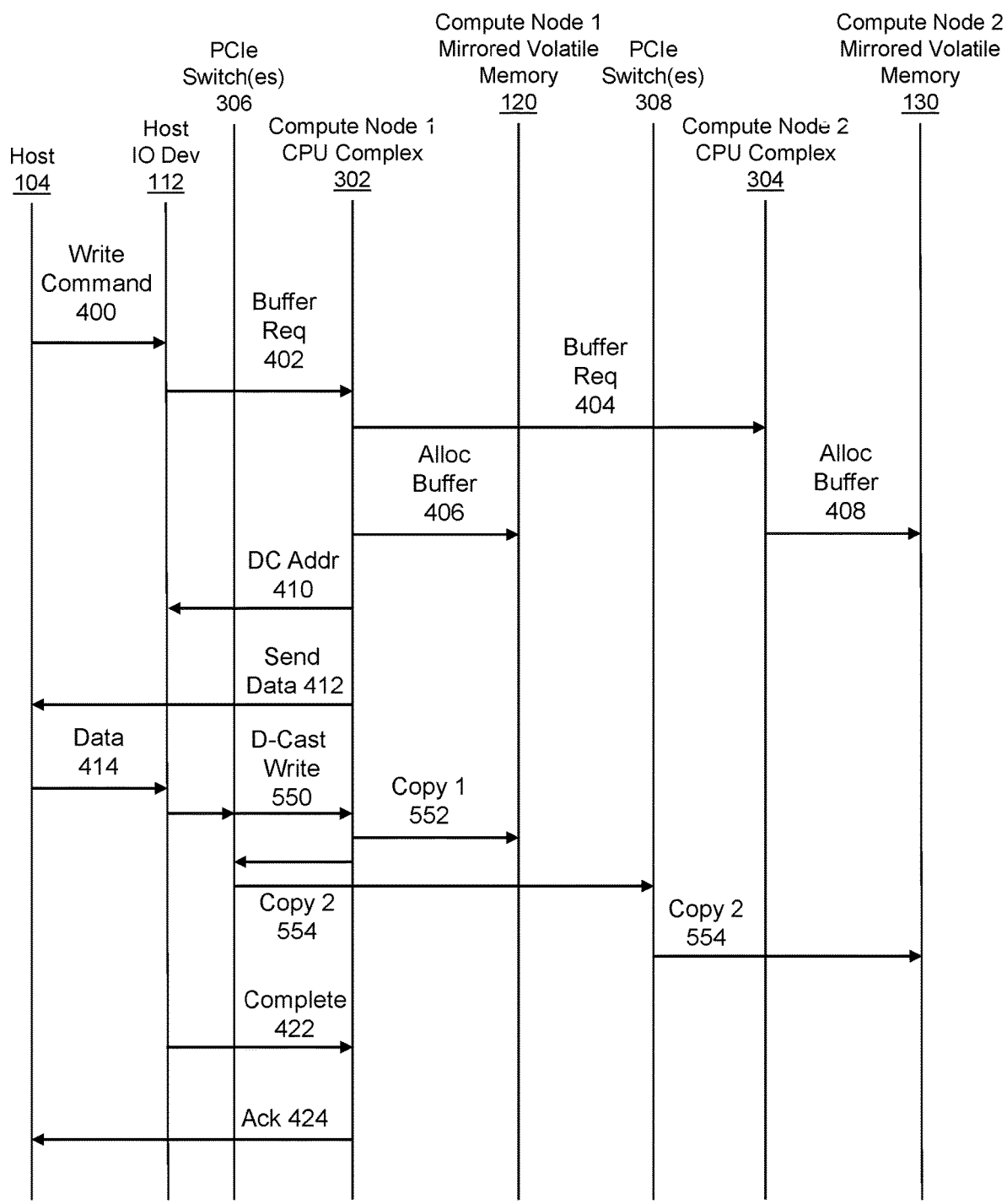
FIG. 5 illustrates alternative signaling associated with dual casting the data in the storage engine of FIG. 3.

FIG. 5 illustrates alternative signaling associated with dual casting the data in the storage engine of FIG. 3. A write command 400 is sent from host 104 to host IO device 112. Responsive signaling from the host IO device to storage control logic running on CPU complex 302 includes buffer requests 402, 404 to obtain free space in the mirrored volatile memory 120, 130 for data associated with the write command. Responsive to the buffer requests, the CPU complexes 302, 304 allocate buffers in their respective mirrored volatile memory 120, 130, which may include related buffer allocation signaling 406, 408. The allocated buffers in each volatile memory mirror have the same range of addresses in a dual casting region. The allocated dual casting region addresses 410 are provided to the host IO device 112. Having completed preparation to receive the data, the CPU complex 302 provides a send data message 412 to host 104 via the host IO device. Host 104 subsequently sends the data 414 to the host IO device 112. The host IO device associates the allocated dual casting addresses with the data, which together form a dual cast region write 550 that is sent to CPU complex 302 via PCIe switch(es) 306. The CPU complex 302 receives the dual cast region write 550 and, responsive to recognition of the addresses as being in the dual casting region of volatile memory, performs a dual cast write by creating and sending a first copy 552 of the data to volatile memory 120 and a second copy of the data 554 to volatile memory 130 via the PCIe NTB 310 (FIG. 3) between the PCIe switches 306, 308. Either or both the first and second copies may be written to the mirrored volatile memory using DMA operations. The host IO device 112 sends a write complete 422 message to the storage control logic running on CPU complex 302, responsive to which the storage control logic sends an acknowledgement 424 to the host 104 via the host IO device 112.

Figure 6:
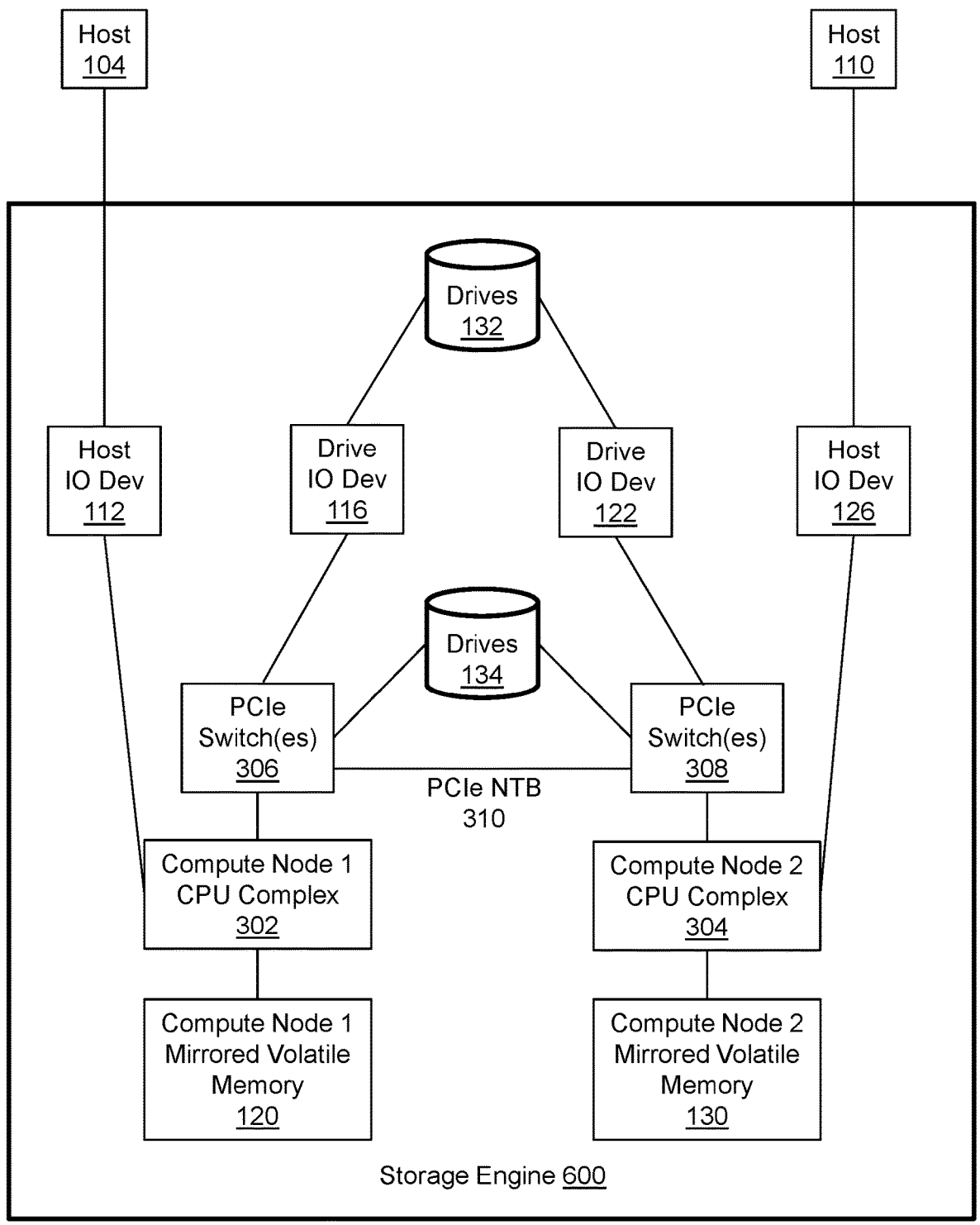
FIG. 6 illustrates a variation of the storage engine in which the host IO devices are directly connected to the CPU complexes and the NTB is between PCIe switches.

FIG. 6 illustrates a variation of the storage engine 600 in which the host IO devices 112, 126 are directly connected to the CPU complexes 302, 304 and the PCIe NTB 310 is between the PCIe switches 306, 308.

Figure 7:
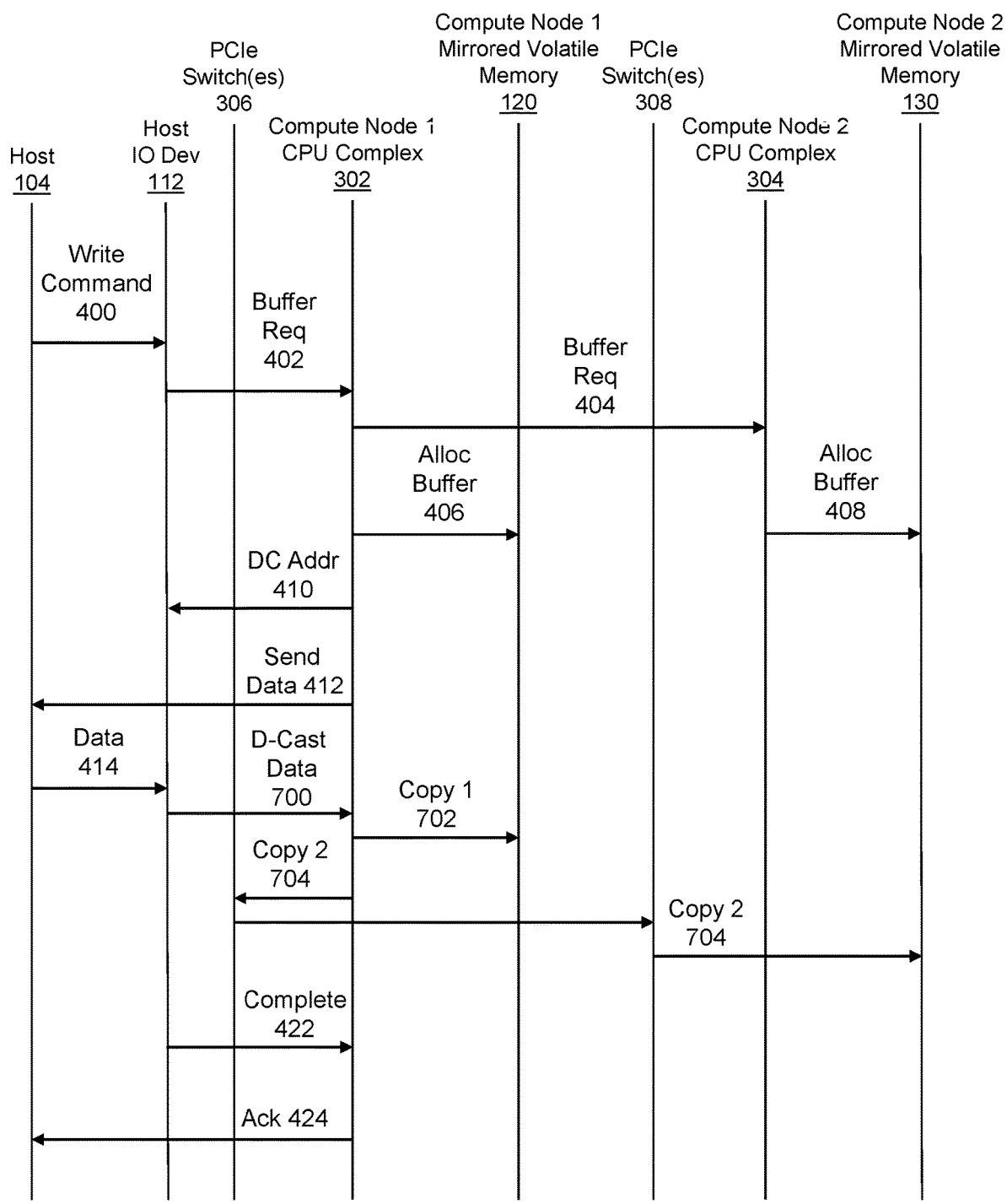
FIG. 7 illustrates signaling associated with dual casting the data in the storage engine of FIG. 6.

FIG. 7 illustrates signaling associated with dual casting the data in the storage engine of FIG. 6. A write command 400 is sent from host 104 to host IO device 112. Responsive signaling from the host IO device to storage control logic running on CPU complex 302 includes buffer requests 402, 404 to obtain free space in the mirrored volatile memory 120, 130 for data associated with the write command. Responsive to the buffer requests, the CPU complexes 302, 304 allocate buffers in their respective mirrored volatile memory 120, 130, which may include related buffer allocation signaling 406, 408. The allocated buffers in each volatile memory mirror have the same range of addresses in a dual casting region. The allocated dual casting region addresses 410 are provided to the host IO device 112. Having completed preparation to receive the data, the CPU complex 302 provides a send data message 412 to host 104 via the host IO device. Host 104 subsequently sends the data 414 to the host IO device 112. The host IO device associates the allocated dual casting addresses with the data, which together form a dual cast region write 700 that is sent to CPU complex 302. The CPU complex 302 receives the dual cast region write 700 and, responsive to recognition of the addresses as being in the dual casting region of volatile memory, dual casts the data 414 by creating and sending a first copy 702 of the data to volatile memory 120 and a second copy 704 of the data to volatile memory 130 via the PCIe NTB 310 (FIG. 6) between the PCIe switches 306, 308. Either or both the first and second copies may be written to the mirrored volatile memory using DMA operations. The host IO device 112 sends a write complete 422 message to the storage control logic running on CPU complex 302, responsive to which the storage control logic sends an acknowledgement 424 to the host 104 via the host IO device 112.

While not directly related to dual casting to mirrored volatile memory, it should be understood that some or all of the non-volatile drives could be directly connected to the CPU complexes. Additionally, or alternatively, some or all of the non-volatile drives could be connected to the CPU complexes via fabrics, e.g., a fabric pair.

Figure 8:
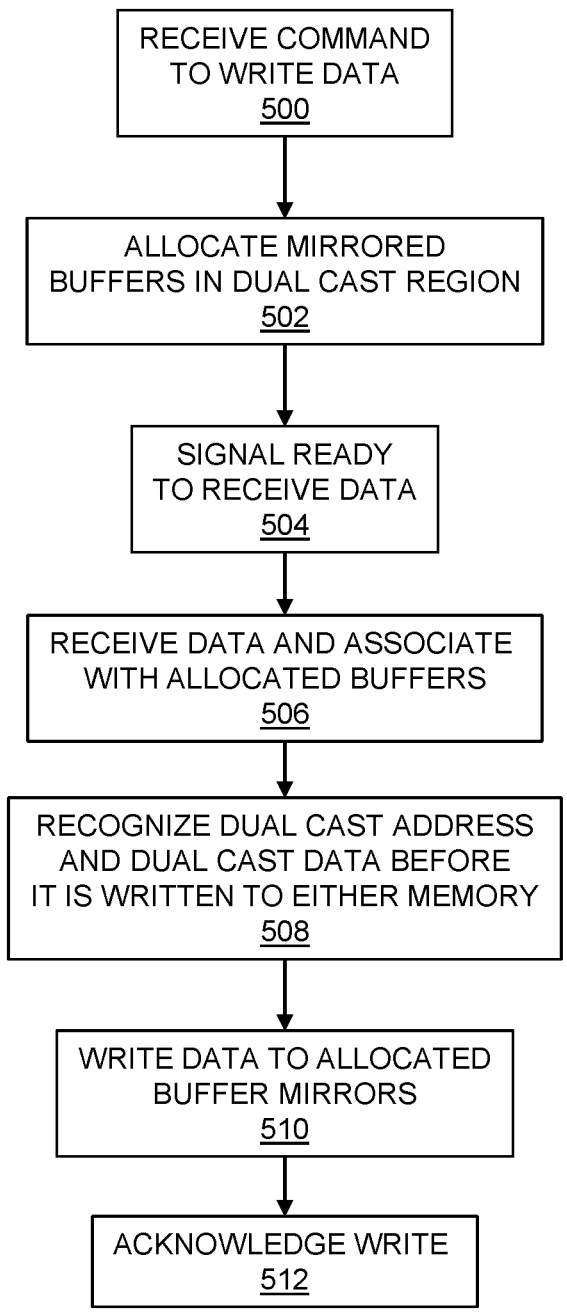
FIG. 8 illustrates a method for dual casting Write IO data before the data is written to mirrored volatile memory in a storage system.

FIG. 8 illustrates a method for dual casting Write IO data. Step 500 is receiving a command to write data. For example, the write command may be received by a storage system from an application running on a host server. Step 502 is allocating mirrored buffers in a dual cast region of mirrored volatile memory. Some or all buffer addresses of the mirrored volatile memory may be configured as a dual cast region. Step 504 is signaling from the storage system to the host server to indicate readiness to receive data. Step 506 is receiving the data from the host server and associating the dual cast addresses of the allocated buffers with the received data. Step 508 is recognizing the dual cast addresses and dual casting the data to both volatile memory mirrors before the data is written to either mirrored memory, e.g., by creating and sending copies. Steps 506 and 508 may be performed by different components or subsystems within the storage system. Step 510 is writing the data to the allocated buffers in the volatile memory mirrors via the dual cast. This may include one or more DMA operations and sending a copy of the dual cast data over a PCIe NTB link between mirrored PCIe switches or CPU complexes. Step 512 is acknowledging the write, i.e., sending an ACK from the storage system to the host server.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A storage system comprising:
   a first compute node comprising at least one processor;
   a first mirrored volatile memory in communication with the first compute node;
   a second compute node comprising at least one processor, the second compute node configured in a failover relationship with the first compute node;
   a second mirrored volatile memory in communication with the first compute node and configured to mirror the first volatile memory;
   a host IO device in communication with a host and the first compute node; and
   dual casting logic configured to create and send a first copy of data associated with a write command to the first mirrored volatile memory and send a second copy of the data to the second mirrored volatile memory before the first copy of the data is written to the first mirrored volatile memory and without reading the data from either the first mirrored volatile memory or the second mirrored volatile memory.

2. The storage system of claim 1 wherein the first volatile memory and the second volatile memory comprise a dual cast region of buffer addresses.

3. The storage system of claim 2 wherein the host IO device is configured to cause the data to be dual casted to both the first volatile memory and the second volatile memory based on an allocated buffer address for the data being in the dual cast region.

4. The storage system of claim 3 wherein the dual cast region is defined by a range of addresses.

5. The storage system of claim 1 comprising a communication link between the first compute node and the second compute node that is used for dual casting.

6. The storage system of claim 1 further comprising a first switch connected between the host IO device and the first compute node, and a second switch connected to the second compute node, and comprising a communication link between the first switch and the second switch that is used for dual casting.

7. The storage system of claim 6 wherein the communication link comprises a Peripheral Component Interconnect Express (PCIe) Non-Transparent Bridge (NTB).

8. A mirroring method implemented in a storage system that includes a first compute node, a first mirrored volatile memory in communication with the first compute node, a second compute node configured in a failover relationship with the first compute node, a second mirrored volatile memory in communication with the first compute node and configured to mirror the first mirrored volatile memory, and a host IO device in communication with a host and the first compute node, the method comprising:
   allocating buffers in a region of dual cast addresses of the first mirrored volatile memory and the second mirrored volatile memory;
   associating the dual cast addresses with received Write IO data; and
   responsive to recognition that the data is associated with dual cast addresses, creating and sending a first copy of the data to the first mirrored volatile memory and creating and sending a second copy of the data to the second mirrored volatile memory before the first copy of the data is written to the first volatile memory and without reading the data from either the first mirrored volatile memory or the second mirrored volatile memory.

9. The method of claim 8 comprising a host IO device associating the dual cast addresses with received Write IO data.

10. The method of claim 9 comprising the first compute node recognizing that the data is associated with dual cast addresses.

11. The method of claim 10 comprising the first compute node sending the first copy of the data to the first volatile memory and sending the second copy of the data to the second volatile memory.

12. The method of claim 11 comprising the first compute node sending the second copy of the data to the second volatile memory via a Peripheral Component Interconnect Express (PCIe) Non-Transparent Bridge (NTB) between the first compute node and the second compute node.

13. The method of claim 9 comprising a first PCIe switch recognizing that the data is associated with dual cast addresses.

14. The method of claim 13 comprising the first PCIe switch sending the first copy of the data to the first volatile memory and sending the second copy of the data to the second volatile memory.

15. The method of claim 14 comprising the first PCIe switch sending the second copy of the data to the second volatile memory via a PCIe Non-Transparent Bridge (NTB) between the first PCIe switch and a second PCIe switch.

16. A non-transitory computer-readable storage medium storing instructions that when executed by a storage system cause the storage system to perform a method for mirroring, the method comprising:
   allocating buffers in a region of dual cast addresses of a first mirrored volatile memory and a second mirrored volatile memory configured to mirror the first mirrored volatile memory;
   associating the dual cast addresses with received Write IO data; and
   responsive to recognition that the data is associated with dual cast addresses, creating and sending a first copy of the data to the first mirrored volatile memory and creating and sending a second copy of the data to the second mirrored volatile memory before the first copy of the data is written to the first mirrored volatile memory and without reading the data from either the first mirrored volatile memory or the second mirrored volatile memory.

17. The non-transitory computer-readable storage medium of claim 16 wherein the method comprises a host IO device associating the dual cast addresses with received Write IO data.

18. The non-transitory computer-readable storage medium of claim 17 wherein the method comprises a first compute node recognizing that the data is associated with dual cast addresses and creating and sending the first copy of the data to the first volatile memory and creating and sending the second copy of the data to the second volatile memory.

19. The non-transitory computer-readable storage medium of claim 18 wherein the method comprises the first compute node sending the second copy of the data to the second volatile memory via a Peripheral Component Interconnect Express (PCIe) Non-Transparent Bridge (NTB) between the first compute node and a second compute node.

20. The non-transitory computer-readable storage medium of claim 17 wherein the method comprises a first PCIe switch recognizing that the data is associated with dual cast addresses and creating and sending the first copy of the data to the first volatile memory and creating and sending the second copy of the data to the second volatile memory.

\* \* \* \* \*